(12) United States Patent
Han

(10) Patent No.: US 10,579,254 B2
(45) Date of Patent: Mar. 3, 2020

(54) METHOD AND APPARATUS FOR REALIZING HUMAN-MACHINE INTERACTION

(71) Applicant: ZTE CORPORATION, Shenzhen, Guangdong Province (CN)

(72) Inventor: Zhengwei Han, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 447 days.

(21) Appl. No.: 15/308,025

(22) PCT Filed: Sep. 11, 2014

(86) PCT No.: PCT/CN2014/086316
§ 371 (c)(1),
(2) Date: Oct. 31, 2016

(87) PCT Pub. No.: WO2015/169017
PCT Pub. Date: Nov. 12, 2015

(65) Prior Publication Data
US 2017/0052697 A1    Feb. 23, 2017

(30) Foreign Application Priority Data
May 4, 2014 (CN) .......................... 2014 1 0185364

(51) Int. Cl.
*G06F 17/00* (2019.01)
*G06F 3/0488* (2013.01)
(Continued)

(52) U.S. Cl.
CPC ........ *G06F 3/04883* (2013.01); *G06F 3/0485* (2013.01); *G06F 3/04845* (2013.01)

(58) Field of Classification Search
CPC .. G06F 3/04883; G06F 3/017; G06F 3/04885; G06F 3/0485
(Continued)

(56) References Cited

U.S. PATENT DOCUMENTS 8,526,767 B2 * 9/2013 Bowens .............. G06F 3/03547
345/173
9,323,340 B2 * 4/2016 Pantel ..................... G06F 3/017
(Continued)

FOREIGN PATENT DOCUMENTS

CN      101799739 A     8/2010
CN      102323827 A     1/2012
(Continued)

OTHER PUBLICATIONS

Sae-Bae et al., Biometric-Rich Gestures: A Novel Approach to Authentication on Multi-touch Devices, ACM 2012, pp. 977-986. (Year: 2012).*
(Continued)

*Primary Examiner* — Cong-Lac Huynh
(74) *Attorney, Agent, or Firm* — Cantor Colburn LLP

(57) ABSTRACT

A method and apparatus for realizing human-machine interaction are disclosed in the embodiments of the present document, including: according to obtained rotation gesture trajectory information, determining a tangential direction of an initial movement trajectory of a rotation trajectory and rotation information; taking the obtained tangential direction as a drag direction, and calculating a drag distance according to obtained rotation information; and performing dragging on a touch screen according to the obtained drag direction and the obtained drag distance.

7 Claims, 3 Drawing Sheets

(51) Int. Cl.
*G06F 3/0485* (2013.01)
*G06F 3/0484* (2013.01)

(58) Field of Classification Search
USPC .......................................................... 715/863
See application file for complete search history.

(56) References Cited

U.S. PATENT DOCUMENTS

| | | | | |
|---|---|---|---|---|
| 2004/0041847 A1* | 3/2004 | Lai | ........................ | G06F 3/0485 715/862 |
| 2004/0100479 A1* | 5/2004 | Nakano | ................. | G06F 1/1626 715/700 |
| 2008/0169778 A1* | 7/2008 | Eguchi | ................. | G05B 13/042 318/561 |
| 2009/0292989 A1* | 11/2009 | Matthews | ............. | G06F 3/0488 715/702 |
| 2010/0083167 A1* | 4/2010 | Kikuchi | ................. | G06F 1/1624 715/786 |
| 2010/0201644 A1 | 8/2010 | Ohshita | | |
| 2010/0207892 A1* | 8/2010 | Lin | ...................... | G06F 3/04883 345/173 |
| 2011/0063234 A1* | 3/2011 | Liu | ......................... | G06F 16/54 345/173 |
| 2011/0205175 A1* | 8/2011 | Chen | ................... | G06F 3/04883 345/173 |
| 2012/0174044 A1* | 7/2012 | Koga | ................. | G06F 3/04883 715/863 |
| 2013/0050276 A1 | 2/2013 | Moriya | | |
| 2013/0215034 A1* | 8/2013 | Oh | ......................... | G06F 3/0416 345/163 |
| 2013/0268883 A1 | 10/2013 | Kim et al. | | |
| 2013/0300710 A1* | 11/2013 | Cho | ........................ | G06F 3/044 345/174 |
| 2013/0342533 A1* | 12/2013 | Bell | ....................... | G06T 19/003 345/420 |
| 2014/0059489 A1 | 2/2014 | Klask et al. | | |
| 2014/0215365 A1* | 7/2014 | Hiraga | ................ | G06F 3/04883 715/765 |
| 2014/0310638 A1* | 10/2014 | Lee | ..................... | G06F 3/04886 715/773 |
| 2014/0320537 A1* | 10/2014 | Zhang | ...................... | G06T 3/60 345/659 |
| 2015/0346829 A1* | 12/2015 | Chang | ..................... | G06F 3/017 345/156 |
| 2016/0098137 A1* | 4/2016 | Kim | ...................... | G06F 1/1643 345/173 |
| 2016/0162098 A1* | 6/2016 | Kim | .................... | G06F 3/04845 345/174 |

FOREIGN PATENT DOCUMENTS

| | | |
|---|---|---|
| CN | 103106033 A | 5/2013 |
| WO | 2015169017 A1 | 11/2015 |

OTHER PUBLICATIONS

Weiss et al., Madgets: Actuating Widgets on Interactive Tabletops, ACM 2010, pp. 293-302. (Year: 2010).*
European Search Report dated Mar. 6, 2017 for EP Application No. 14891384.1.
Chinese Office Action dated Jun. 2, 2017 for Chinese Patent Application No. 201410185364.1.
International Search Report and Written Opinion dated Feb. 6, 2015 for International Patent Application No. PCT/CN2014/086316.

* cited by examiner

METHOD AND APPARATUS FOR REALIZING HUMAN-MACHINE INTERACTION

CROSS-REFERENCE TO RELATED APPLICATION(S)

This application is the U.S. National Phase application of PCT application number PCT/CN2014/086316 having a PCT filing date of Sep. 11, 2014, which claims the priority of Chinese patent application 201410185364.1 filed on May 4, 2014, the disclosures of which are hereby incorporated by reference.

TECHNICAL FIELD

The present document relates to the touch screen technology, and particularly, to a method and apparatus for realizing human-machine interaction.

BACKGROUND OF RELATED ART

With the rapid development of the smart mobile terminal, the human-machine interaction techniques based on the touch screen are widely used, and a drag gesture is one of the frequently-used techniques. At present, mainstream mobile operating systems, such as an Android operating system (ANDROID), an iPhone operating system (IOS) and a Microsoft Windows phone operating system (WINDOWS PHONE) and so on, universally use the drag gesture in the human-machine interaction. In a terminal device with the touch screen, if the contents required to be displayed by the touch screen on a certain interface are beyond a display range of the touch screen, when a user needs to view other contents, generally a finger will be used to press the touch screen, while pressing is kept, the finger will drag along a certain required direction, and at this point, the display contents of the touch screen will move with the drag direction of the user, and the finger is lifted until a target location is reached, such an operation is defined as drag gesture.

For a traditional drag gesture, the display contents of the touch screen move with a drag direction and a drag distance, each operation may only drag a length or width of one touch screen at most. When there are a great many contents required to be displayed, usually the target location cannot be reached by one drag of the user, thus multiple drag operations are required to be repeatedly performed.

In particular, with the increasing enhancement of function and performance of the miniaturized touch screen devices, and the miniaturized touch screen devices are widely applied in various fields of production and life, the traditional drag gesture is often required to perform repeated drag operations for every time the drag distance is very short in a miniaturized touch screen device, therefore, a problem of extremely low drag efficiency is caused, which makes the users feel very troublesome, thereby failing to satisfy the demands of the user flexibly, efficiently and conveniently operating a miniaturized touch screen device.

SUMMARY OF THE INVENTION

In order to solve the above technical problem, the embodiments of the present document provide a method and apparatus for realizing human-machine interaction, which can conveniently and effectively enhance the drag efficiency, thereby improving the drag experience for users.

The embodiment of the present document discloses a method for realizing human-machine interaction, which includes:

according to obtained rotation gesture trajectory information, determining a tangential direction of an initial movement trajectory of a rotation trajectory, and rotation information;

taking the obtained tangential direction as a drag direction, and calculating a drag distance according to the obtained rotation information; and performing dragging on a touch screen according to the obtained drag direction and the obtained drag distance.

Preferably, the rotation information at least includes a rotation distance or a rotation angle.

Preferably, the method further includes: obtaining a rotation direction of the rotation gesture trajectory information.

Preferably, the rotation information includes a rotation distance; the method further includes: presetting a first proportion parameter for the drag distance and the rotation distance;

calculating a drag distance according to the obtained rotation information includes: calculating a product of the first proportion parameter and the rotation distance, and an obtained product value is the drag distance.

Preferably, the rotation information includes a rotation angle; the method further includes: presetting a second proportion parameter for the drag distance and the rotation angle;

calculating a drag distance according to the obtained rotation information includes: calculating a product of the second proportion parameter and the rotation angle, and an obtained product value is the drag distance.

Preferably, after taking the obtained tangential direction as the drag direction, the method further includes: when determining that a current rotation direction is changed, turning the drag direction into a reverse direction.

The embodiment of the present document further discloses an apparatus for realizing human-machine interaction, which includes a rotation gesture processing module, a gesture mapping module and a driver module, herein, the rotation gesture processing module is configured to, according to obtained rotation gesture trajectory information, determine a tangential direction of an initial movement trajectory of a rotation trajectory, and rotation information;

the gesture mapping module is configured to take the tangential direction from the rotation gesture processing module as a drag direction, and calculate a drag distance according to the rotation information from the rotation gesture processing module; and the driver module is configured to perform dragging on a touch screen according to the drag direction and the drag distance from the gesture mapping module.

Preferably, the rotation gesture processing module is further configured to obtain a rotation direction of the rotation trajectory;

the gesture mapping module is further configured to, when determining that a current rotation direction from the rotation gesture processing module is changed, turn the drag direction into a reverse direction.

Preferably, the rotation information at least includes a rotation distance or a rotation angle.

Preferably, the gesture mapping module is configured to preset a first proportion parameter for the drag distance and the rotation distance; and calculate a product of the first proportion parameter and the rotation distance, and an obtained product value is the drag distance.

Preferably, the gesture mapping module is configured to preset a second proportion parameter for the drag distance and the rotation angle; and calculate a product of the second proportion parameter and the rotation angle, and an obtained product value is the drag distance.

The embodiment of the present document further provides a computer program, which includes program instructions, herein, when the program instructions are executed by a terminal, the terminal may implement the above method.

The embodiment of the present document further provides a carrier carrying the above computer program.

Through the technical scheme provided in the embodiments of the present document, on one hand, one continuous rotation gesture corresponds to several discontinuous traditional drag gestures, which effectively enhances the drag efficiency, thereby avoiding that repeated drag operations are usually required to be performed on the miniaturized touch screen devices, and evidently improving the drag experience for users. On the other hand, the method is operated more conveniently, so that the drag may be accomplished to reach the target location by continuously sliding the finger once but without repeatedly sliding the finger within a small range of the touch screen, thereby satisfying the requirements of the efficient and convenient gesture drag operation well when the display range of the touch screen is far less than the display contents.

BRIEF DESCRIPTION OF THE DRAWINGS

FIG. 4 (b) is a schematic diagram of the rotation gesture and the traditional drag gesture corresponding to the rotation gesture in the embodiment of a smartwatch realizing human-machine interaction according to the present document;

FIG. 4 (c) is a schematic diagram of the finally displayed contents on the touch screen in the embodiment of a smartwatch realizing human-machine interaction according to the present document;

DETAILED DESCRIPTION

Figure 1:
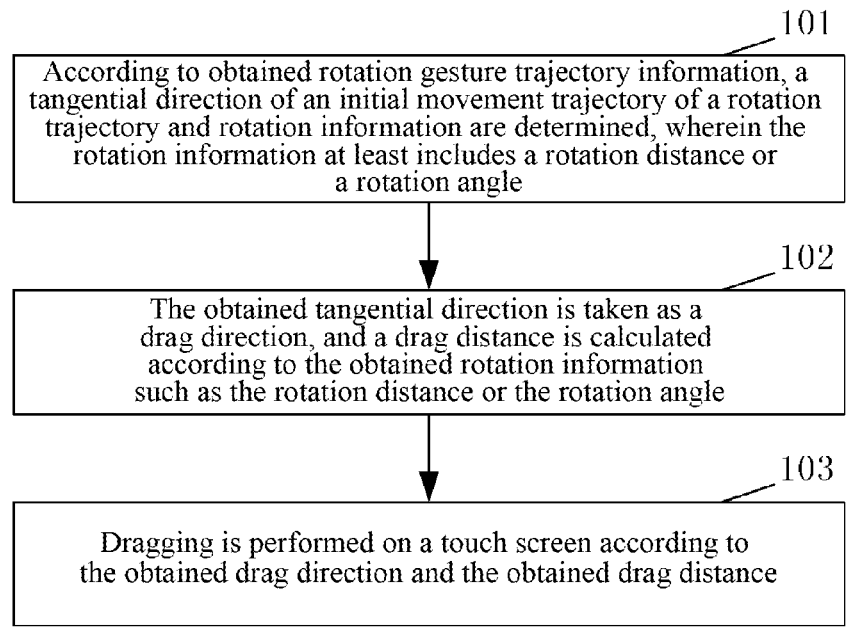
FIG. 1 is a flow chart of a method for realizing human-machine interaction according to an embodiment of the present document.

The embodiments of the present document will be described in detail in combination with the accompanying drawings below. It should be noted that the embodiments in the present document and the characteristics in the embodiments can be arbitrarily combined with each other in the case of no conflict.

The steps shown in the flow chart of the accompanying drawings may be executed in a computer system which includes a group of computer executable instructions. Moreover, though a logical sequence shown in the flow chart, in some cases, the illustrated or described steps may be executed in a sequence which is different from here.

The rotation gesture is the extension technique of the traditional drag gesture, and it refers to permitting a user's finger to continuously rotate for multiple circumferences in the operation process of the traditional drag gesture.

In order to obtain rotation gesture trajectory information, generally touch information of the finger will be obtained in real time through the related hardware and driver of the touch screen firstly, and the touch information at least includes touch point trajectory, touch point pressure and touch point area of the finger and so on.

Then, the touch point trajectory of the touch information is processed to obtain related parameters of the touch point trajectory of the rotation gesture. The related parameters of the touch point trajectory of the rotation gesture are the rotation gesture trajectory information, which mainly includes: parameters such as sampling coordinates of touch point trajectory segments, a rotation distance, a rotation angle, a rotation direction and a rotation speed and so on.

Herein, the touch point trajectory may be represented as a set of touch point trajectory segments, the touch point trajectory segments are trajectory segments obtained by cutting the touch point trajectory according to parameters including a preset time threshold and a preset distance threshold and so on, here, a unit of the distance threshold may be set as millimeter, and a unit of the time threshold may be set as millisecond.

The sampling coordinates are a set of coordinates obtained by sampling the touch point trajectory segments according to a preset sampling time interval, and the sampling time interval is far less than the time threshold and it is to guarantee that multiple coordinates may be obtained by sampling within the distance threshold.

The rotation distance is a sliding distance of the touch point trajectory, and may be accurate to millimeter.

The rotation angle is an angle corresponding to rotation cycles of the touch point itself, for example, rotation of one cycle corresponds to 360 degrees, and may be accurate to 1 degree.

The rotation direction is a rotating direction of the touch point, and includes a clockwise direction and an anti-clockwise direction.

The rotation speed is a movement speed of the touch point, and may be accurate to millimeter or millisecond.

The above specific implementation techniques of obtaining, identifying and processing the touch information belong to the conventional technical means of the people skilled in the art, which is not used to limit the protection scope of the present document and will not be repeated here.

FIG. 1 is a flow chart of a method for realizing human-machine interaction according to an embodiment of the present document, and as shown in FIG. 1, the following steps are included:

In step 101, according to obtained rotation gesture trajectory information, a tangential direction of an initial movement trajectory of a rotation trajectory, and rotation information are determined. Here, the rotation information at least includes: a rotation distance or a rotation angle.

Herein, the tangential direction of the initial movement trajectory is a tangential direction of a first touch point trajectory segment in a set of touch point trajectory segments, the people skilled in the art may easily obtain a tangential direction corresponding to a point of bisection of sampling coordinates of the first touch point trajectory segment according to the related knowledge of the mathematical field, and take the tangential direction as the tangential direction of the initial trajectory.

The obtainment of the rotation distance or the rotation angle belongs to the conventional technical means of the people skilled in the art, which will not be repeated here.

In step 102, the obtained tangential direction is taken as a drag direction, and a drag distance is calculated according to the obtained rotation information.

Herein, when the rotation information includes a rotation distance, the method also includes: a first proportion parameter for the drag distance and the rotation distance is preset, herein the first proportion parameter may be 1, or 0.5, or 1.2 and so on.

When the rotation information includes a rotation angle, the method also includes: a second proportion parameter for the drag distance and the rotation angle is preset, herein the second proportion parameter may be 1, or 0.5, or 1.2 and so on.

In the step, calculating a drag distance according to the obtained rotation information includes: it is to calculate a product of the first proportion parameter and the rotation distance or a product of the second proportion parameter and the rotation angle, and an obtained product value is the drag distance.

There are still many methods for calculating the drag distance by setting the relationship between the drag distance and the rotation information, for example, calculating a drag distance according to the obtained rotation information in the step may also include: it is to calculate a product of the first proportion parameter, the rotation distance and a speed proportion parameter, or a product of the second proportion parameter, the rotation angle and a speed proportion parameter, and an obtained product value is the drag distance. Herein, the speed proportion parameter is a ratio of a rotation speed to a standard speed, the standard speed is a numerical value of the preset speed, and the unit may be millimeter or millisecond. Based on the technical scheme provided in the embodiments of the present document, the methods for calculating the drag distance are easily conceived by the people skilled in the art, which will not be repeated here.

In step 103, the dragging is performed on a touch screen according to the obtained drag direction and the obtained drag distance. Thus, the contents are beyond the display range of the touch screen will move into the display range in real time according to the drag direction and the drag distance corresponding to the rotation gesture. The implementation of the step belongs to the known art for the people skilled in the art, which will not be repeated here.

Preferably, the step 101 also includes: a rotation direction of the rotation gesture trajectory information is obtained, herein, the rotation direction includes a clockwise direction and an anti-clockwise direction.

Accordingly, after the tangential direction is taken as the drag direction in the step 102, the step also includes: when it is to determine that the current rotation direction is changed, the drag direction is turned into a reverse direction.

Herein the determination includes: the rotation direction of the current touch point trajectory segment is compared with the saved rotation direction of the last touch point trajectory segment, and if the two rotation directions are different, it indicates that the current rotation direction is reversed, herein, the reversion of the rotation direction appears when the original rotation direction is continuously changed and the rotation of the rotation gesture turns to a reverse direction during the sliding operation of the rotation gesture, that is to say, when the reversion occurs, the rotation direction changes from the clockwise direction to the anti-clockwise direction or changes from the anti-clockwise direction to the clockwise direction. For example, before the rotation direction is reversed, assuming that the drag direction is upward, when it is to determine that the rotation direction is reversed, the drag direction is changed to downward.

Figure 2:
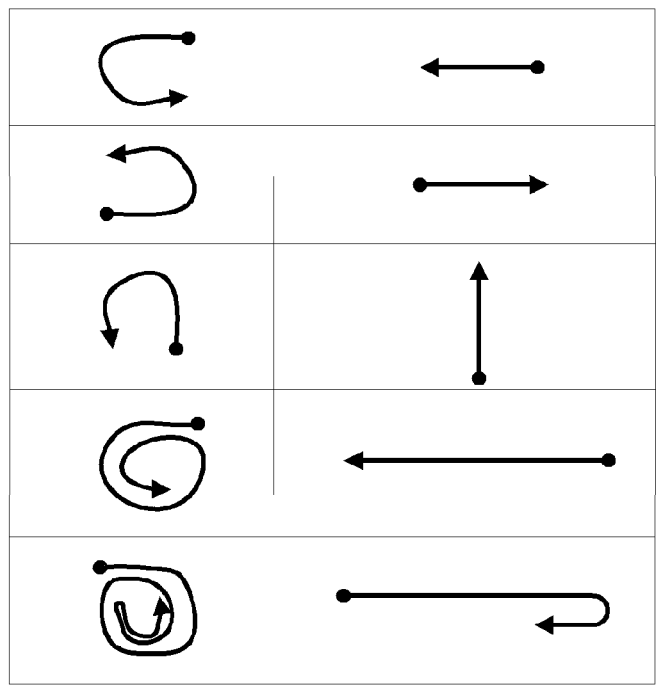
FIG. 2 is a schematic diagram of correspondence between a rotation gesture and a traditional drag gesture according to an embodiment of the present document.

FIG. 2 is a schematic diagram of correspondence between a rotation gesture and a traditional drag gesture according to an embodiment of the present document. In FIG. 2, a starting point of the gesture is represented by a dot, and a tail end is represented by an arrow. As shown in FIG. 2, FIG. 2 shows five examples, the gestures in the left column indicate the rotation gesture, and those in the right column indicate the corresponding traditional drag gesture. Herein the gesture at the 5th row of the left column shows a rotation gesture reversed halfway, and it may be seen that the corresponding traditional drag gesture at the 5th row of the right column firstly drags rightwards and then turns to a reverse direction during the halfway, and continues to drag leftwards. In the above embodiment, the method shown in FIG. 1 also supports multiple times of changes of the rotation direction in the operation process of the rotation gesture, thereby supporting multiple times of reversed drags in one rotation gesture.

Figure 3:
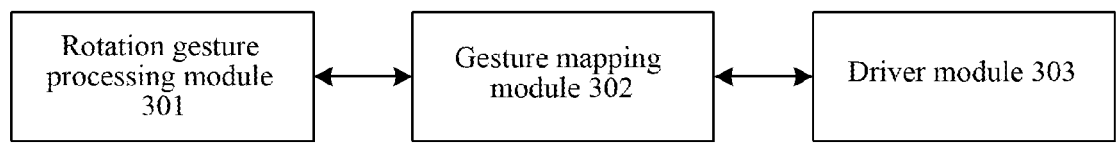
FIG. 3 is a schematic diagram of a composition structure of an apparatus for realizing human-machine interaction according to an embodiment of the present document.

FIG. 3 is a schematic diagram of a composition structure of an apparatus for realizing human-machine interaction according to an embodiment of the present document. As shown in FIG. 3, a rotation gesture processing module 301, a gesture mapping module 302 and a driver module 303 are at least included; wherein, the rotation gesture processing module 301 is configured to, according to the obtained rotation gesture trajectory information, determine a tangential direction of an initial movement trajectory of a rotation trajectory and rotation information; herein, the rotation information at least includes: a rotation distance or a rotation angle;

the gesture mapping module 302 is configured to take the tangential direction from the rotation gesture processing module 301 as a drag direction, and calculate a drag distance according to the rotation information from the rotation gesture processing module 301; and the driver module 303 is configured to perform dragging on a touch screen according to the drag direction and the drag distance from the gesture mapping module 302.

Preferably, the rotation gesture processing module 301 is further configured to obtain a rotation direction of the rotation trajectory, herein the rotation direction includes a clockwise direction and an anti-clockwise direction.

Accordingly, the gesture mapping module 302 is further configured to, when it is to determine that the current rotation direction from the rotation gesture processing module 301 is changed, turn the drag direction into a reverse direction.

Preferably, the gesture mapping module is configured to, preset a first proportion parameter for the drag distance and the rotation distance; and calculate a product of the first proportion parameter and the rotation distance, and an obtained product value is the drag distance.

Preferably, the gesture mapping module is configured to preset a second proportion parameter for the drag distance and the rotation angle; and calculate a product of the second proportion parameter and the rotation angle, and an obtained product value is the drag distance.

The apparatus of the embodiment of the present document may be set in a terminal device with the touch screen.

One application of the embodiment of the present document is a miniaturized touch-screen smartwatch. The following Table 1 is all the contents required to be displayed in the embodiment of the smartwatch realizing human-machine interaction according to the present document. As shown in Table 1, assuming that the smartwatch is currently required to display one phone book, the entire page contains 15 rows of name-phone information in total.

TABLE 1

| | |
|---|---|
| Zhang Yi | 13666668976 |
| Zhang Er | 13788909876 |
| Zhang San | 13099876789 |
| Zhang Si | 13345678765 |
| Zhang Wu | 13999877899 |
| Chen Yi | 13565433456 |
| Chen Er | 13000009876 |
| Chen San | 15353535353 |
| Chen Si | 13111113333 |
| Chen Wu | 13300009090 |
| Wang Yi | 13111110011 |
| Wang Er | 13555556788 |
| Wang San | 13344445567 |
| Wang Si | 13888889999 |
| Wang Wu | 13222523255 |

Figure 4A:
FIG. 4 (a) is a schematic diagram of the initially displayed contents on the touch screen in the embodiment of a smartwatch realizing human-machine interaction according to the present document.
Figure 4B:
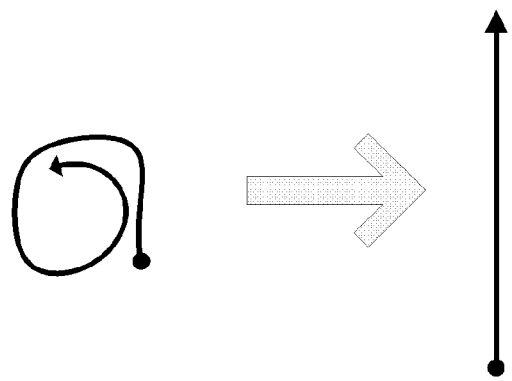
Figure 4C:
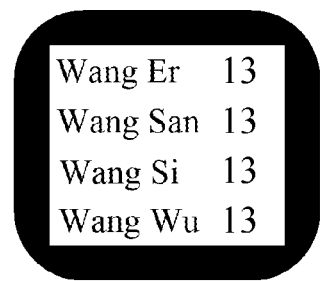

FIG. 4 (a) is a schematic diagram of the initially displayed contents on the touch screen in the embodiment of a smartwatch realizing human-machine interaction according to the present document. As shown in FIG. 4 (a), since the size of the display screen of the watch is very limited, only 4 rows can be displayed, and the touch screen initially displays a top left corner of the entire phone book.

FIG. 4 (b) is a schematic diagram of the rotation gesture and the traditional drag gesture corresponding to the rotation gesture in an embodiment of a smartwatch realizing human-machine interaction according to the present document. In order to look for a contact person "Wang Wu", the user performs an operation on the touch screen according to a rotation gesture shown at the left side of the FIG. 4 (b). The rotation gesture is mapped into an upward long drag gesture with the distance far beyond the size of the touch screen according to the method of the present document, as shown at the right side of the FIG. 4 (b). After the user performs such rotation gesture operation, the smartwatch makes a response according to the upward long drag, and the page of the smartwatch moves upwards, the new display contents of the touch screen are as shown in FIG. 4 (c). According to the method of the present document, on the smartwatch, the user only needs a single rotation gesture operation and the location of the contact person "Wang Wu" is reached.

FIG. 4 (c) is a schematic diagram of the finally displayed contents on the touch screen in the embodiment of a smartwatch realizing human-machine interaction according to the present document. As shown in FIG. 4 (c), if the user uses the traditional drag gesture, according to the contents required to be displayed as shown in Table 1 and the contents initially displayed by the touch screen as shown in FIG. 4 (a), the unidirectional drag is required to be repeated at least thrice on the touch screen of the watch, then the location of the "Wang Wu" may be reached.

Figure 5:
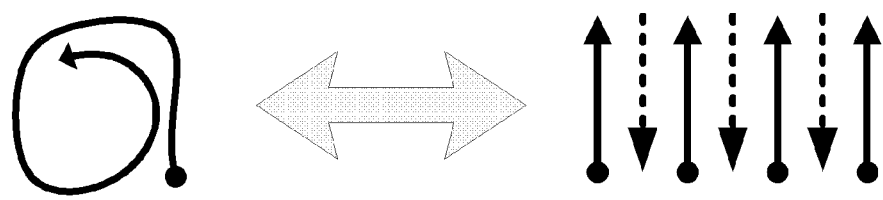
FIG. 5 is a schematic diagram of comparison between one rotation gesture and corresponding multiple traditional drag gestures according to an embodiment of the present document.

FIG. 5 is a schematic diagram of comparison between one rotation gesture and corresponding multiple traditional drag gestures according to an embodiment of the present document. Dotted lines in FIG. 5 represent invalid gestures which refer to that the user finger does not touch the touch screen. As shown in FIG. 5, one continuous rotation gesture corresponds to several discontinuous traditional drag gestures, obviously, multi-repeated traditional drag gestures are avoided with the human-machine interaction method using the rotation gesture in the present document, and invalid finger actions are eliminated in the meantime.

On a smartphone with the touch screen, the human-machine interaction method using the rotation gesture in the present document may also be applied. In normal conditions, since the touch screen of this kind of smartphone is larger, the user may mainly use the traditional drag gesture operation when operating the smartphone, and combine with the rotation gesture at the same time to improve the operation efficiency and convenience of the human-machine interaction. Here, for example, when the user drags the page with the traditional drag gesture on the smartphone with the touch screen, since there are many page contents, even though it is to slide to the tail end of the touch screen, the target location is still not reached. At this point, the user may keep pressing the finger, and continuously perform rotation slides in any direction, thus according to the method of the embodiment of the present document, these rotation slides will continue to drag the page contents along the current drag direction, which avoids multi-repeated traditional drag gestures, and eliminates invalid finger actions in the meantime.

Figure 6:
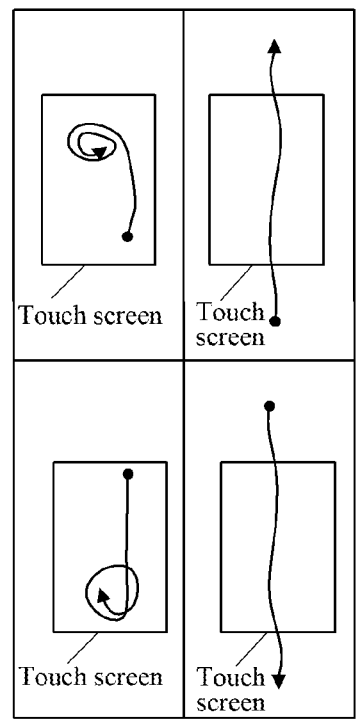
FIG. 6 is a schematic diagram of an embodiment of a rotation gesture operation on a smartphone with the touch screen according to the present document.

FIG. 6 is a schematic diagram of an embodiment of a rotation gesture operation on a smartphone with the touch screen according to the present document. As shown in FIG. 6, two rotation gestures are exemplarily shown in the left column, and corresponding traditional drag gestures are shown in the right column. In fact, the traditional drag gestures shown in the right column cannot be implemented one time on the touch screen based on the existing method since the span is far beyond the size of the touch screen. Moreover, on the smartphone with the touch screen, the rotation gesture can not only implement the long-distance drag that cannot be implemented by the traditional drag gesture, but also can improve the movement distance of the finger compared to the traditional drag gesture when performing shorter-distance dragging, which is convenient for the user to operate by one hand, and effectively improves the operation convenience.

It should be understood that, a method for realizing human-machine interaction disclosed in the embodiment of the present document can not only be applied to a terminal device with the touch screen, such as a miniaturized touch-screen smartwatch and a smartphone with the touch screen, but also can be applied to other human-machine interaction devices with the touch screen, such as an intelligent learning machine with the touch screen and a tablet personal computer and so on.

Though the embodiments disclosed in the present document are as above, the contents mentioned are embodiments adopted only for an easier understanding of the present document, which is not used to limit the present document. Any person skilled in the art to which the present document belongs can make any modifications and changes to the forms and details of the implementation in the premise of not departing from the rule and scope disclosed in the present document, but the patent protection scope of the present document should still be subject to the scope defined in the appended claims.

The ordinary person skilled in the art can understand that all or part of steps of the above embodiments can be implemented by using a flow of computer program, and the computer program can be stored in a computer readable memory medium, and the computer program is executed on corresponding hardware platforms (such as a system, equipment, device and component and so on), and when the program is carried out, one of or a combination of the steps of the method embodiments is included.

Alternatively, all or part of the steps of the above embodiments also can be implemented by using integrated circuits, these steps can be made into a plurality of integrated circuit modules respectively or a plurality of modules or steps of them can be made into a single integrated circuit module to be implemented. Therefore, the present document is not limited to any combination of hardware and software in a specific form.

The devices/function modules/function units in the above embodiments can be implemented through a universal calculating device, and they can be concentrated on a single calculating device or distributed in a network consisting of a plurality of calculating devices.

If implemented in a form of software function module and sold or used as an independent product, the devices/function modules/function units in the above embodiments can be stored in a computer readable memory medium. The computer readable memory medium mentioned above can be a read-only memory, magnetic disk or optical disk and so on.

INDUSTRIAL APPLICABILITY

Through the technical scheme provided in the embodiments of the present document, on one hand, one continuous rotation gesture corresponds to several discontinuous traditional drag gestures, which effectively enhances the drag efficiency, thereby avoiding that repeated drag operations are usually required to be performed on the miniaturized touch screen devices, and evidently improving the drag experience for users. On the other hand, the method is operated more conveniently, so that the drag may be accomplished to reach the target location by continuously sliding the finger once but without repeatedly sliding the finger within a small range of the touch screen, thereby satisfying the requirements of the efficient and convenient gesture drag operation well when the display range of the touch screen is far less than the display contents.

What is claimed is:

1. A method for realizing human-machine interaction, comprising:
    determining a tangential direction of an initial movement trajectory of a rotation trajectory and rotation information according to obtained rotation gesture trajectory information;
    taking the determined tangential direction as a drag direction, and calculating a drag distance according to the determined rotation information; and
    performing dragging on a touch screen according to the drag direction and the calculated drag distance;
    wherein, when the rotation information comprises a rotation distance:
        presetting a first proportion parameter for the drag distance and the rotation distance; and
        calculating a drag distance according to the determined rotation information as a product of the first proportion parameter and the rotation distance, where the calculated product value is the calculated drag distance; or,
    wherein, when the rotation information comprises a rotation angle:
        presetting a second proportion parameter for the drag distance and the rotation angle; and
        calculating a drag distance according to the determined rotation information as a product of the second proportion parameter and the rotation angle, where the calculated product value is the calculated drag distance.

2. The method according to claim 1, further comprising: obtaining a rotation direction of the rotation gesture trajectory information.

3. The method according to claim 2, further comprising: after taking the determined tangential direction as the drag direction, when determining that a current rotation direction is changed, turning the drag direction into a reverse direction.

4. A computer program, comprising program instructions, which, when executed by a terminal, enable the terminal to implement the method according to claim 1.

5. A non-transitory computer storage medium storing the computer program according to claim 4.

6. An apparatus for realizing human-machine interaction, comprising a rotation gesture processing module (301), a gesture mapping module (302), and a driver module (303), wherein,
    the rotation gesture processing module (301) is configured to, according to obtained rotation gesture trajectory information, determine a tangential direction of an initial movement trajectory of a rotation trajectory, and rotation information;
    the gesture mapping module (302) is configured to take the determined tangential direction from the rotation gesture processing module (301) as a drag direction, and calculate a drag distance according to the determined rotation information from the rotation gesture processing module (301); and
    the driver module (303) is configured to perform dragging on a touch screen according to the drag direction and the calculated drag distance from the gesture mapping module (302);
    wherein, when the rotation information comprises a rotation distance, the gesture mapping module (302) is configured to preset a first proportion parameter for the drag distance and the rotation distance and calculate a product of the first proportion parameter and the rotation distance, where the value of the calculated product is the calculated drag distance;
    or,
    wherein, when the rotation information comprises a rotation angle, the gesture mapping module (302) is configured to preset a second proportion parameter for the drag distance and the rotation angle and calculate a product of the second proportion parameter and the rotation angle, where the value of the calculated product is the calculated drag distance.

7. The apparatus according to claim 4, wherein, the rotation gesture processing module (301) is further configured to obtain a rotation direction of the rotation trajectory;
    the gesture mapping module (302) is further configured to, when determining that a current rotation direction from the rotation gesture processing module (301) is changed, turn the drag direction into a reverse direction.

* * * * *